United States Patent [19]

Momont

[11] Patent Number: 4,982,699
[45] Date of Patent: Jan. 8, 1991

[54] FLOOR WATERER HANGER

[75] Inventor: Timothy W. Momont, Nappanee, Ind.

[73] Assignee: CTB, Inc., Milford, Ind.

[21] Appl. No.: 375,150

[22] Filed: Jun. 30, 1989

[51] Int. Cl.$^5$ .................................................. A01K 7/00
[52] U.S. Cl. ..................................... 119/72.5; 119/72; 248/68.1
[58] Field of Search .......................... 119/72, 72.5, 74; 248/68.1, 59, 60, 61, 328, 70, 69

[56] References Cited

U.S. PATENT DOCUMENTS

| | | | |
|---|---|---|---|
| 4,724,797 | 2/1988 | Steudler | 119/72 |
| 4,753,196 | 6/1988 | Lack et al. | 119/72 |
| 4,794,881 | 1/1989 | Rader | 119/72.5 |

*Primary Examiner*—John G. Weiss
*Attorney, Agent, or Firm*—Richard Bushnell

[57] ABSTRACT

A hanger device integrally molded of plastic for a watering system for use in animal husbandry which facilitates the assembly of a watering system without the need for fasteners or tools. The hanger member is a vertically oriented beam member having a top end and a bottom end, the top end of which is attached to a flexible cord to suspend the watering system above a surface, the bottom end of which is formed with a pipe supporting portion to support a water pipe at the lowermost end of the hanger. Positioned generally in between the top and bottom ends of the hanger are a anti-roost wire bore and a support member bore. The anti-roost member bore provides insulated suspension of the electrified anti-roost wire between the hanger members and the support member bore provides a bore through which a structural support member projects over the entire length of the system. The support member bore has bearing surfaces formed on the inside of the bore which facilitate relative sliding of the support member and the water pipe held by the hanger members upon thermal contraction or expansion of the support member and water pipe.

18 Claims, 3 Drawing Sheets

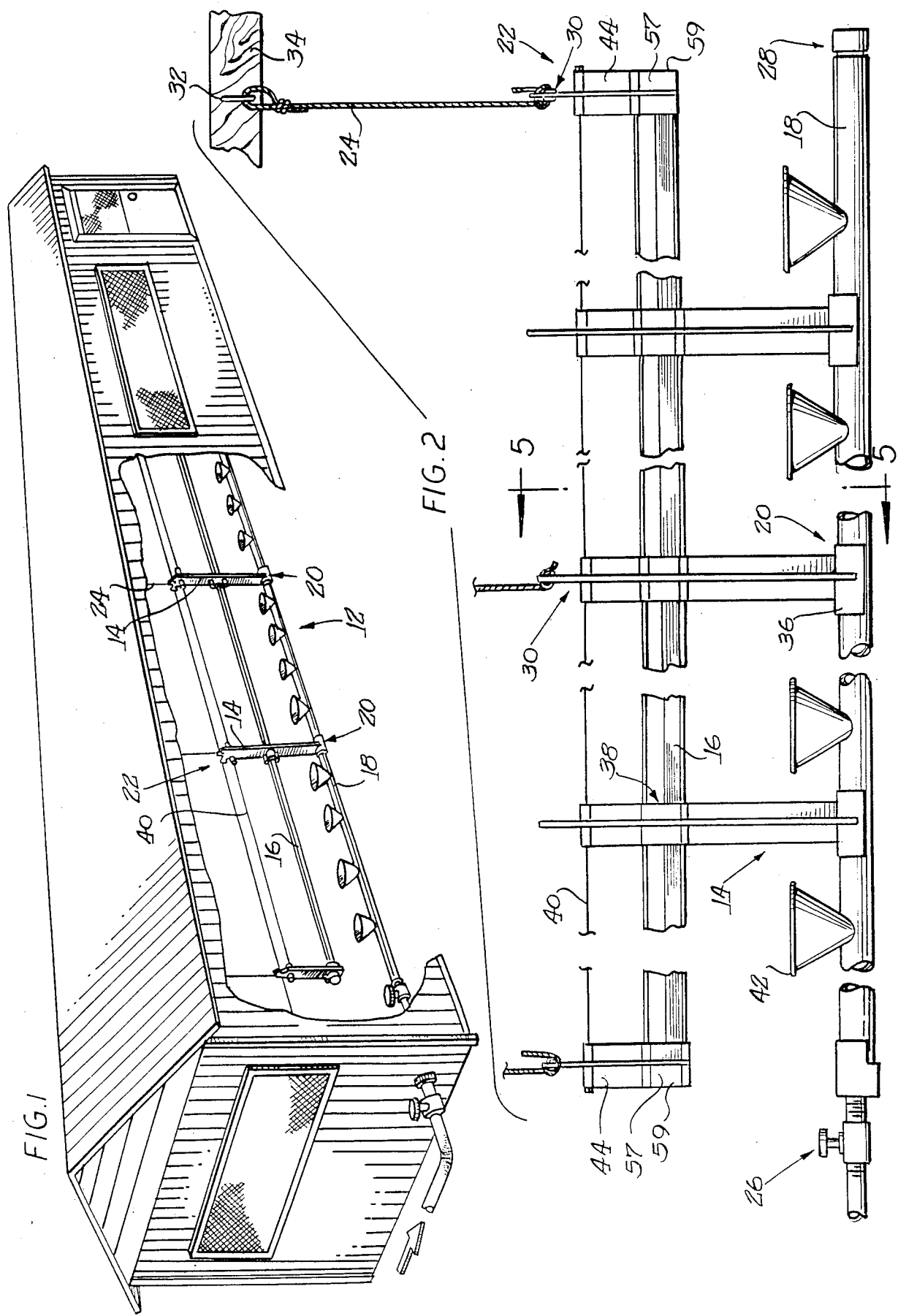

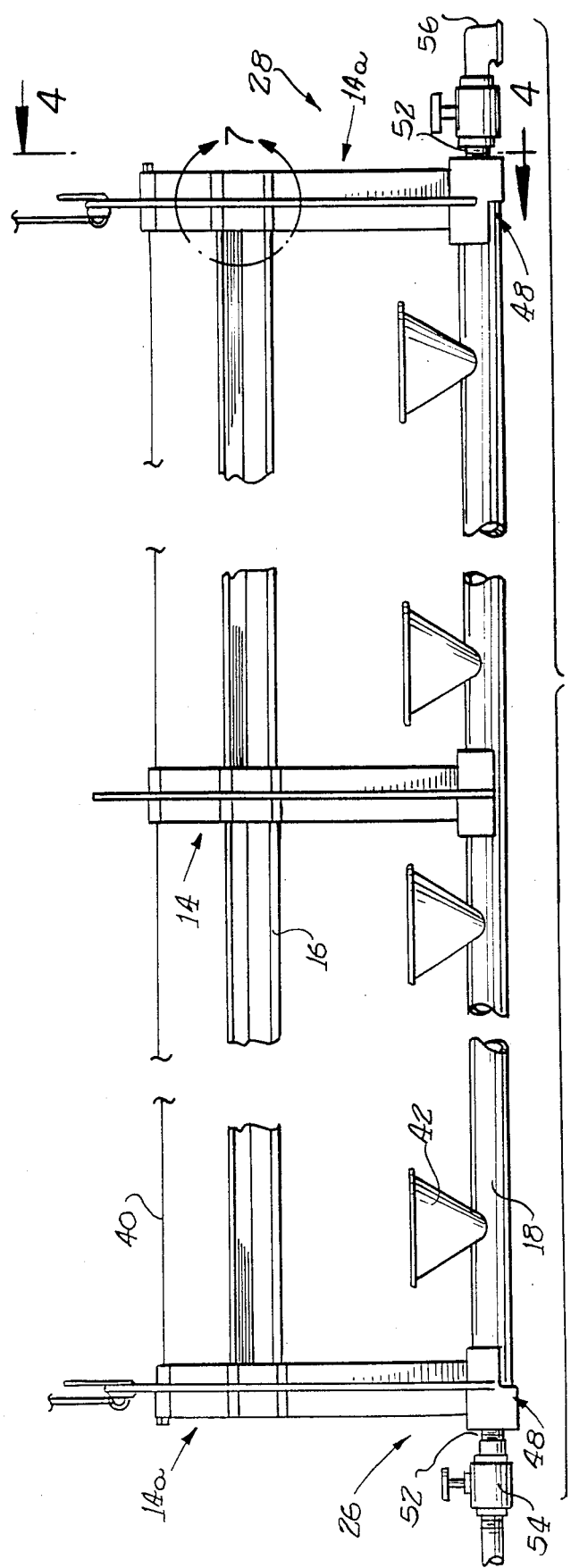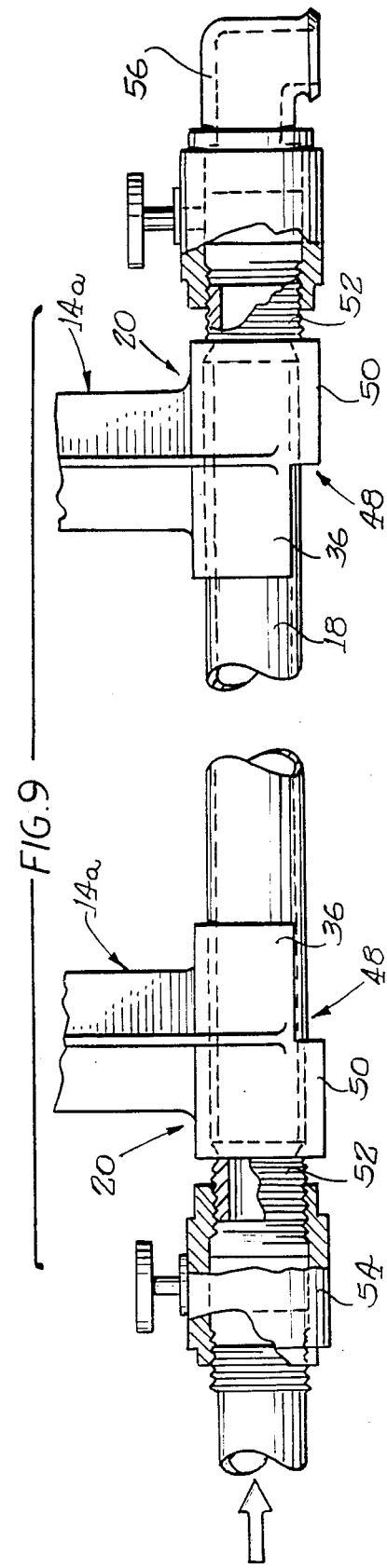
FIG. 3
FIG. 9

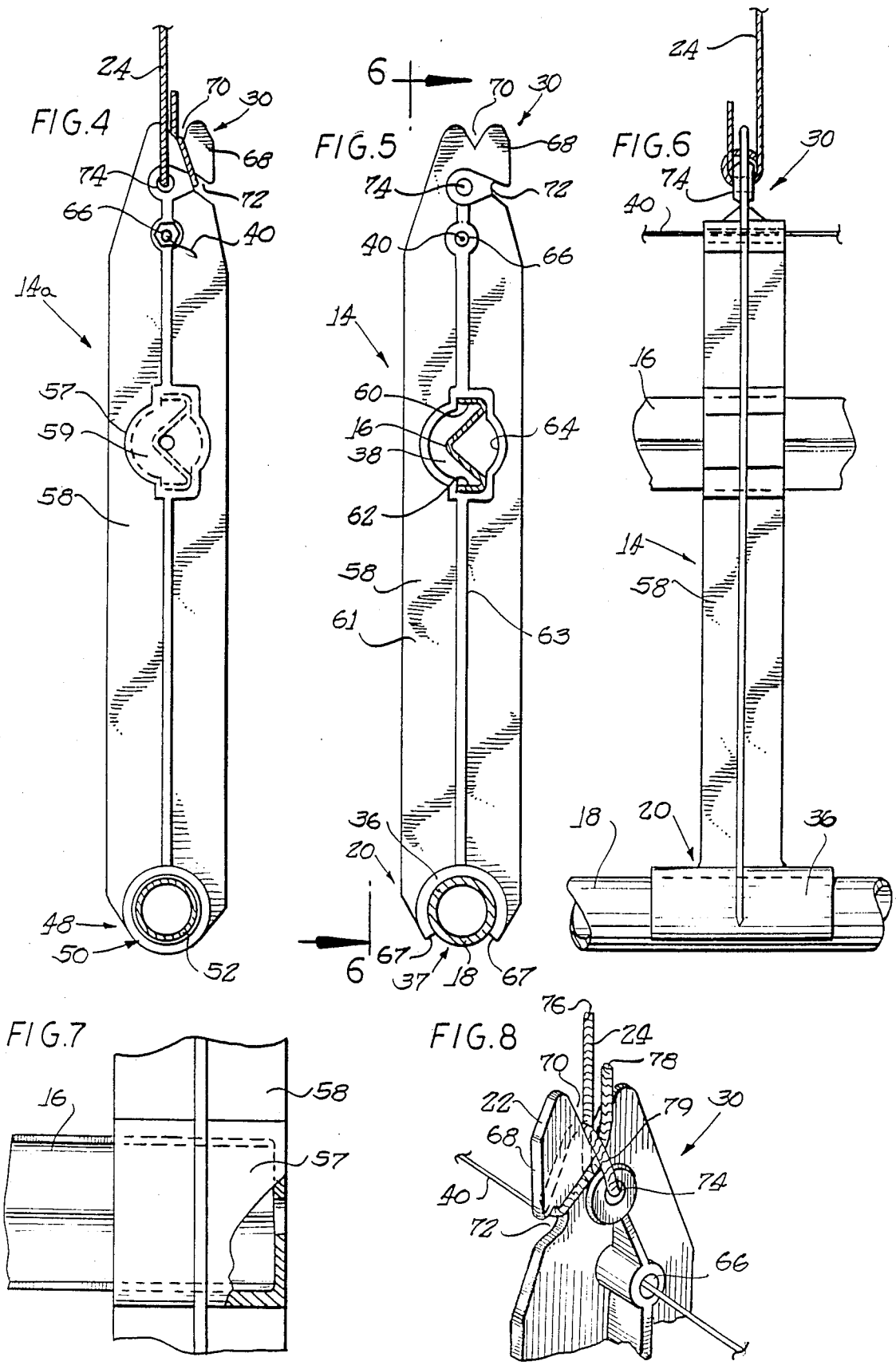

:

FLOOR WATERER HANGER

BACKGROUND OF THE INVENTION

This invention relates to a watering system which is used in animal husbandry or the like and more particularly to a hanging waterer for poultry and the like.

Animal husbandry is a vital sector of national, and in fact, world agribusiness. In order for this segment of agriculture to be profitable for the producer, the producer must be able to implement technology which increases the economy and efficiency of his operation. It is well known that implementation of low maintenance or maintenance free devices, where feasible, can help improve the economy and efficiency of many systems. As such, industries supporting animal husbandry have provided technology which minimizes human interaction in the feeding and watering of animals.

For example, the Swish watering system manufactured by Swish Watering Systems, Milford, Ind., provides an automatic watering system to deliver fresh water to chickens, turkeys and other fowl. This watering system provides the animals with a constant supply of fresh, clean water upon depression of a specially designed valve mounted within a drinking cup which is attached to a water pipe. For small chicks, the pipe is laid directly on the ground to provide the chicks with easy access to water. For larger animals such as young or full grown chickens or turkeys, the watering system is suspended to prevent the animals from polluting the drinking cups and damaging the system by stepping or roosting on it.

To suspend the watering system for the larger animals, the prior art provides a support member under which the watering system water pipe is attached by means of fasteners and metal straps. In this prior art system, the metal straps are attached to the support member, usually a structural metal pipe or metal channel, by means of threaded fasteners requiring the use of tools to assemble the watering system. The portion of the strap which secures the water pipe underneath the support member is also attached using a threaded fastener or the like and likewise requiring the use of tools to assemble.

In an alternative embodiment, the watering pipe is constructed of metal such that for limited lengths a structural member is not required. However, a major problem with metal pipes is that they can potentially contaminate the water delivered to the animals. For instance, animal raisers commonly medicate the water flowing through the watering system as an economical and efficient means of delivering medication. However, the effect of the medication on the metal may have an adverse effect on the animals. Therefore, it is preferable to use a plastic pipe to deliver water to the animals and suspend the plastic pipe from a support member since the plastic pipe, when filled with water, is incapable of self support over distances.

Also, in both of the above-mentioned alternative embodiments of the prior art watering system, an anti-roost wire is suspended a specified distance above the drinking cups or the support member to prevent the animals from stepping or roosting on the water pipe. The anti-roost wire is an electrical conductor which carries a small current to deter the animals from stepping or roosting on the water pipe and/or support member.

A problem which results from using a steel support member and a plastic water pipe is that plastic has a coefficient of thermal expansion approximately seven times that of steel. If the support member and the water pipe are not permitted to move independently of each other, the resulting differential in coefficients can result in damage or failure of the watering system. Failure results by one member restricting the expansion or contraction of the other member thereby rupturing or bending one of the members. Should the water pipe become ruptured, a potential for water damage to both the animals and the animal housing exists.

OBJECTS OF THE INVENTION

A general object of this invention is to provide a floor waterer system having a hanger structure which permits a support beam and a water pipe associated with the watering system to independently axially move while retained in operative association by the hanger structure.

Another general object of the invention is to provide a floor waterer system which can be assembled without fasteners or tools.

Yet another object of the present invention is to provide a floor waterer system hanger having a suspension horn which secures the hanger to a suspension cord by inducing the suspension cord to create a gripping purchase on itself thereby eliminating the need for fasteners.

In accordance with the foregoing, the present invention comprises a plurality of hangers in combination with a support beam and a water pipe of a watering system for use in animal husbandry, wherein the beam and pipe are made from different material having different coefficients of thermal expansion and the hangers are constructed so as to permit relative expansion and contraction of the pipe and beam without damage to the system.

BRIEF DESCRIPTION OF THE DRAWINGS

The features of the present invention which are believed to be novel are set forth with particularity in the appended claims. The organization and manner of the operation of the invention, together with the further objects and advantages thereof may best be understood by reference to the following description taken in connection with the accompanying drawings in which like reference numerals identify like elements, and in which:

FIG. 1 is a partial fragmentary perspective view of a poultry house in which a continuous section watering system is illustrated;

FIG. 2 is an enlarged partial fragmentary side view of the continuous watering system illustrated in FIG. 1;

FIG. 3 is a partial fragmentary side view of a discrete length watering system showing hangers with integrally formed end couplings in which the ends of the water pipe are securely retained;

FIG. 4 is an enlarged sectional view taken along line 4—4 in FIG. 3;

FIG. 5 is an enlarged sectional view taken along the line 5—5 in FIG. 2;

FIG. 6 is a fragmentary side view taken along line 6-6 in FIG. 5;

FIG. 7 is an enlarged fragmentary view of detail 7 in FIG. 3 showing a support member blind end as formed in the beam member support portion of the hanger;

FIG. 8 is an enlarged fragmentary perspective view of a suspension means attachment portion of a hanger illustrating a suspension horn, suspension means bore, and anti-roost insulating bore; and FIG. 9 is an enlarged partial fragmentary view of water controlling hardware coupled to threaded nipples of end hangers.

DETAILED DESCRIPTION OF THE ILLUSTRATED EMBODIMENT

While this invention is acceptable to embodiment in many different forms, there is shown in the drawings and will herein be described in detail, two specific embodiments with the understanding that the present disclosure is to be considered an exemplification of the principles of the invention, and is not intended to limit the invention to the embodiments illustrated.

It should be noted that dimensional relationships between members of the illustrated embodiments may vary in practice or may have been varied in the illustrations to emphasize certain features of the invention.

FIG. 1 provides a partial fragmentary perspective view of a poultry house in which a continuous watering system 12 is illustrated. As viewed through the fragmentary portion in the side of the poultry house, the watering system 12 is comprised of hanger means or hanger members 14 which hold and secure a support member or beam 16 preferably, although not necessarily, formed from steel, adding structural support to the watering system 12, and a water pipe 18 preferably formed from plastic to which is attached to a bottom end or portion 20 of the hanger members 14.

Suspension means in the form of flexible element 24 such as cords or cables are connected to top ends 22 of the hanger members 14, to hold the continuous watering system 12 a distance above the floor of the poultry house. The hanger members 14 are spaced periodically along the length of the watering system 12 to provide secure support for the supporting member 16 and the water pipe 18.

The watering system 12 illustrated in FIG. 1 is shown in greater detail in the fragmentary side elevational view of FIG. 2. FIG. 2 shows a source end 26 and a terminal end 28 as well as hanger members 14 periodically spaced over the length of the watering system 12. The top end 22 of each hanger member 14 has formed thereon a suspension means attaching portion 30 for securing the hanger 14 to suspension means 24 which is secured to a suspension means anchor 32 such as an eye bolt connected to an overhead support member 34. Also, it should be obvious to one skilled in the art that the suspension means 24 is securable directly to the overhead support member 34 without the suspension means anchor 32.

Located at the bottom end 20 of each hanger member 14 is a pipe supporting portion 36 which securely retains the water pipe 18 to the hanger member 14. The cross section of the pipe supporting portion 36 is a non-continuous circular shape which cooperatively mates with the shape of the water pipe 18 retained therein. The water pipe 18 is snapped into the pipe supporting portion 36 through the open section 37 (better illustrated in FIG. 5 and described herein below).

Positioned between the suspension means attaching portion 30 and the pipe supporting portion 36 is a support member bore 38 formed through the hanger member 14. The support member bore 38 securely retains the support member 16 thereby providing structural support for the watering system 12. Positioned between the top portion 22 of the hanger member 14 and the support member 16 is an anti-roost wire 40 which is suspended between the hanger members 14 to deter animals from stepping or roosting on the support member 16 or the water pipe 18 and attached drinking cups 42. The cups 42 include water controlling valves of known construction, for example, such as shown in U.S. Pat. No.4,282,831 to Nilsen.

The continuous watering system 12 as shown in FIGS. 1 and 2 is assembled using the hanger member 14 approximately every four feet and attachment to the suspension means 24, such as a cord or cable, every eight feet. Also, every other hanger member 14, preferably although not necessarily, the hanger member 14 attached to the suspension means 24, is suitably adhesively connected between the inside surface of the pipe supporting portion 36 and the corresponding contacting portion of the water pipe 18. These periodic adhesive connections between the hanger members 14 and the water pipe 18 prevent the pipe 18 from rotating thereby maintaining the drinking cups 42 in a servicable accessible position.

As shown in the illustration of FIG. 2, a support end hanger member 44 is mounted to the source end 26 and the terminal end 28 of the continuous length watering system. The support end hanger member 44 does not provide attachment of the hanger member 44 to the water pipe 18. The continuous waterer system may extend for the length of a poultry house and may be up to several hundred feet long. In long systems the differential between the thermal expansion and contraction of the support 16 and pipe 18 can be substantial. The absence of the pipe supporting portion 36 on the support end hangers 44 accommodates the different coefficients of thermal expansion of the support member 16 and water pipe 18.

Shorter configurations of the watering system, such as the discrete length system illustrated in FIG. 3, are assembled in substantially the same manner as the continuous watering system illustrated in FIG. 1. In such short applications hanger members 14a at the ends of the watering system section preferably are provided with integrally formed end hanger water pipe couplings 48. The end hanger water pipe couplings or end couplings 48, as shown on the ends of the watering system section of FIG. 3, are illustrated in greater detail in the fragmentary view illustrated in FIG. 9.

As shown in FIG. 9, the end couplings 48 are formed at the bottom end 20 of the hanger members 14a such that a portion of the pipe supporting portion 36 is formed to completely surround the pipe 18 to provide a pipe enclosing portion 50 into which the pipe 18 is inserted to couple the pipe to the end coupling 48. To secure the water pipe 18 in engagement with the end coupling 48, an appropriate adhesive is used between the outside of the water pipe 18 and the inside of the pipe enclosing portion 50 of the end coupling 48. The end hanger source pipe coupling 48 is also integrally formed with a threaded nipple end 52, which permits attachment of water control hardware such as a control valve 54 and/or a spigot 56.

An enlarged view of detail 7 in FIG. 3 is shown in FIG. 7. FIG. 7 illustrates the construction of a blind end or socket 57 with a closed end wall 59 formed in the hanger 14a. The socket 57 captively retains the support member 16 to prevent the support member 16 from accidentally becoming dislodged from the watering system. It is noted that the end hangers 44 of the embodiment shown in FIGS. 1 and 2 also have sockets 57 with closed end walls 59 for retaining the support member 16.

As shown in FIG. 4, the pipe enclosing portion 50 of the end coupling 48 completely encloses the end of the water pipe 18. Water passes through or is terminated at the end coupling 48 via the water control hardware 54, 56 attached to the threaded nipple 52.

As shown in detail in FIGS. 5 and 6 the hanger 14 comprises a generally vertically oriented beam member 58 comprising crossed flanges or webs 61 and 63 which are integrally formed with the previously mentioned top end 22, suspension means attachment portion 30, pipe supporting portion 36, and the support means receiving sleeve or support member bore 38.

As illustrated in FIG. 5, the support member sleeve or bore 38 is shown retaining a support member 16, having a generally reversed sigma shape, between upper and lower bearing surfaces 60, 62. The support member bore 38 is formed to accommodate either the reverse sigma shaped support member 16 as shown or a tubular support member. As will be obvious to one skilled in the art, the support member sleeve 38 may be formed to accommodate a variety of appropriate support member cross-sections without departing from the scope of the invention. However, regardless of the support member 14 cross sectional shape the internal surface of the support member bore 38 is a bearing surface 64, 60, 62 to facilitate relative sliding of the support member 16 retained within the support member bore 38.

Also, as shown in FIG. 5, a wire insulating bore 66 is integrally formed with the hanger beam 58 between the top end 20 and the support member 16 a specified distance above the support member 16 for guiding and retaining anti-roost wire 40 between the hanger members 14 over the length of the watering system 12.

Electrified anti-roost wire 40 is suspended between the hangers 14 of the watering system 12 to deter animals from stepping or roosting on the support member 16 and the water pipe 18. Since the material used to integrally form the insulating bore 66 in hanger member 14 is preferably a non-conductive material such as ABS PVC or other suitable plastic, a separate insulator between the hanger member 14 and the wire bore 66 is obviated.

The pipe supporting portion 36 has a generally downwardly facing C-shaped configuration and is formed to cooperatively mate with the cross-sectional shape of the water pipe 18 while permitting the pipe 18 to be inserted into the pipe supporting portion 36 in a snap fit or press-in fashion. The water pipe 18 is snapped into the pipe supporting portion 36 by urging the pipe 18 past the open section 37. The insertion force applied to the pipe 18 flexes the edge portions 67 slightly to permit insertion of the pipe 18 whereupon the edge portions 67 flex back to their "as formed" shape to retain the water pipe 18. As such, the press-in mounting of the water pipe 18 into the pipe supporting portion 36, and the secure retention of the water pipe 18 therein, obviates the need for individual fasteners to retain the water pipe 18 on the hanger member 14 or tools to operate fasteners.

As previously mentioned, where necessary, an appropriate amount of a suitable adhesive is applied between the outer surface of the water pipe 18 and the inner surface of the pipe supporting portion 36 to prevent the water pipe 18 from rotating while held within the pipe supporting portion 36. However, it is noted that adhesive should only be applied where necessary to prevent rotation of the water pipe 18 within the pipe supporting portion 36 thereby accommodating the expansion and contraction of the water pipe 18 retained within the pipe supporting portion 36.

As shown in FIGS. 5 and 8, the suspension means attaching portion 30 is integrally formed on the top end 22 of the hanger means 14. Preferably, the suspension means 24 used with the present invention is a flexible cord or other relatively flexible material such as an appropriate size, suitably strong cable. The suspension means attaching portion 30 comprises a suspension horn 68 integrally formed on the top end 22 of the hanger means 14. A top notch 70 and a lower side notch 72 are formed on the suspension horn 68 of the point which the suspension horn 68 is integrally formed with the hanger member 14. In addition, a bore 74 is formed beneath to notch 70 and laterally inwardly of the notch 72.

As shown in greater detail in the enlarged perspective view of the suspension means 30 illustrated in FIG. 8, the suspension means 24 is threaded through the suspension means bore 74 and wrapped around the suspension horn 68 to provide a purchase to adjustably secure the flexible cord 24 to the suspension means attaching portion 30. More specifically, the flexible cord 24 is threaded through the suspension means bore 74, up along a first side of the suspension horn 68 and over and into the top notch 70, down along a second side of the suspension horn 68 and under and into the lower notch 72, back up along the first side of the suspension horn 68 and under the flexible cord 24 positioned through the suspension means bore 74 and over and in the top notch 70, a trailing end 76 of the flexible cord 24 is securely attached to the overhead support 34 and a free end 78 being accessible to elevationally adjust the watering system 12. The downward force exerted on the trailing end 76 securely grips the free end 78 which is threaded under a looped portion 79 of the flexible cord 24. The relatively thin cross-section of the beam 58 at the top portion 22 of the hanger member 14 promotes hanging of the hanger member 14, suspended from the suspension means 24, in the manner described above, in a generally vertically oriented position.

The hanger member and all of its constituent portions is a single piece integrally formed of an appropriate plastic such as ABS or PVC. As described hereinabove, the hanger member 14 permits the assembly of a water system without fasteners or tools by providing slide through, snap-on and wrap around attachments of the suspension means 24, anti-roost wire 40, support member 16, and the water pipe 18. Therefore, the watering system described hereinabove provides a simplified, economical and efficient hanger member 14 for the assembly of a watering system.

While a preferred embodiment of the present invention is shown and described, it is envisioned that those skilled in the art may devise various modifications of the present invention without departing from the spirit and scope of the appended claims.

The invention is claimed as follows:

1. A watering system for use in animal husbandry, said watering system having a water pipe for transporting water through said watering system, suspension means for suspending said watering system above a surface, support means for strengthening and structurally supporting said watering system, and hanger means for retaining said watering system components in operative engagement, said hanger means comprising; a vertically oriented beam member having a top end and a bottom end, a suspension horn integrally formed on said top end of said vertically oriented beam member for adjustably engaging said suspension means for suspending said hanger means form said suspension means, a water pipe supporting portion integrally formed on said bottom end of said vertically oriented beam member for cooperatively engaging said water source pipe, and support means engaging means integrally formed and positioned generally between said top end and said water pipe supporting portion for slidably retaining said support member.

2. A watering system according to claim 1 further including a top notch and a lower notch formed on said suspension horn for providing a suspension means gripping purchase when said suspension means is cooperatively engaged with said suspension horn.

3. A watering system according to claim 1 wherein said suspension means comprises a flexible cord for releasably adjustably engaging said suspension horn.

4. A watering system according to claim 3 wherein said suspension means is a flexible cord and said suspension horn comprises; a suspension means bore through which said flexible cord projects, a top notch and a lower notch formed on said suspension horn, and said flexible cord is inserted through said bore and wrapped about said suspension horn for providing a gripping purchase to adjustably secure said flexible cord to said suspension means attaching portion.

5. A watering system according to claim 1 wherein a portion of said vertically oriented beam member between said water pipe supporting portion and said support means is formed to provide sufficient clearance between said drinking cups mounted to said water pipe and said support means for permitting animals of a particular size to receive water from said watering system.

6. A watering system according to claim 1 wherein said hanger is a one piece member integrally formed of plastic.

7. A watering system according to claim 6 in which electrical anti-roost wire is suspended between a plurality of said hangers over the length of said support member a distance above said support member for deterring animals from stepping and roosting on said support member and said water pipe, and said hanger further comprises a wire insulating bore formed between said top end and said support means engaging means a specified distance above said support member for guiding and retaining said electrical anti-roost wire between said hangers over the length of said support member.

8. A water system for use in animal husbandry comprising; a water pipe for transporting water through said watering system with drinking cups spaced along said water pipe permitting animals to access water, suspension means for suspending said watering system above a surface, support means for strengthening and supporting said watering system and a plurality of hanger means for retaining said watering system components in operative engagement, said hanger means further comprising a vertically oriented beam member having a top end and a bottom end, a suspension horn integrally formed in said top end of said vertically oriented beam member for adjustably engaging said suspension means for suspending said hanger means from said suspension means, a water pipe supporting portion integrally formed in said bottom end of said vertically oriented beam member for cooperatively engaging said water source pipe, and support means engaging means integrally formed and positioned generally between said top end and said water pipe supporting portion for cooperatively retaining said support member.

9. A watering system for use in animal husbandry as in claim 8 wherein said support means is generally freely axially movable for permitting axial thermal distortion of said support means, and at least one hanger is securely coupled to said water source pipe for preventing axial rotation of said water source pipe such that said drinking cups are maintained in an accessible serviceable orientation.

10. A watering system for use in animal husbandry as in claim 8 wherein said water pipe supporting portion of said hanger means is formed with a water pipe coupling for providing couplable termination of the free ends of said water pipe.

11. A watering system for use in animal husbandry as in claim 10 wherein said water pipe coupling formed on said water pipe supporting portion is formed with at least one threaded nipple end for coupling water controlling hardware to said water pipe of said watering system.

12. A watering system for use in animal husbandry as in claim 8 wherein certain of said hanger means positioned at an end of a of said watering system are formed without a water pipe supporting portion for permitting said support means to be freely axially distorted by thermal variations independent of said water pipe.

13. A watering system for use in animal husbandry as in claim 8 wherein said support means engaging means comprises; a support means aperture formed through said vertically oriented beam member through which said support means projects for retaining said support means in operative engagement with said watering system.

14. A watering system for use in animal husbandry as in claim 13 wherein said support means aperture has inwardly facing bearing surfaces contacting the outwardly facing surface of said support means for promoting relative axial movement of said support means resulting from thermal expansion and contraction of said support means due to thermal means.

15. A watering system according to claim 8 wherein said plurality of hanger means include opposite end hangers and at least one intermediate hanger, said opposite end hangers include sockets for receiving and retaining opposite ends of said support means, said socket being formed with one open end for receiving said water pipe and a closed end, said intermediate hangers including said support means engaging means which slidably engages said support means, and at least some of said intermediate hangers being fixed with respect to said pipe.

16. A watering system for use in animal husbandry, said watering system having a water pipe for transporting water through said watering system, suspension means for suspending said watering system above a surface, support means for strengthening and structurally supporting said watering system, and hanger means for retaining said watering system components in operative engagement, a suspension means attaching portion integrally formed in a top end of said hanger means for suspending said hanger means from said suspension means, said suspension means attaching portion comprising a suspension horn integrally formed on said to end of said support means, a top notch and a lower notch formed on said suspension horn for providing a suspension means gripping purchase when said suspension means is cooperatively engaged with said suspension horn.

17. A watering system for use in animal husbandry, said watering system having a water pipe for transporting water through said watering system, a flexible cord for suspending said watering system above a surface, support means for strengthening and structurally supporting said watering system, and hanger means for retaining said watering system components in operative engagement, said hanger means comprising; a vertically oriented beam member having a top end and a bottom end, a suspension means attaching portion integrally formed on said top end of said vertically oriented beam member for suspending said hanger means from said suspension means, said suspension means attaching portion including a suspension horn, a top notch and a lower notch formed on said suspension horn, a suspension means bore through which said flexible cord projects, said flexible cord being insertable through said bore and adjustably wrapped about said suspension horn through said top notch and said lower notch for providing a gripping purchase to adjustably secure said flexible cord to said suspension means attaching portion, a water pipe supporting portion integrally formed on said bottom end of said vertically oriented beam member for cooperatively engaging said water pipe, and support means engaging means integrally formed and positioned generally between said top end and said water pipe supporting portion for slidably retaining said support member.

18. A watering system for use in animal husbandry, said watering system having a water pipe for transporting water through said watering system, suspension means for suspending said watering system above a surface, support means for strengthening and structurally supporting said watering system, and hanger means for retaining said watering system components in operative engagement, said hanger means comprising; a vertically oriented beam member having a top end and a bottom end, a suspension horn integrally formed on said top end of said vertically oriented beam member for suspending said hanger means from said suspension means, a top notch and a lower notch formed in said suspension horn for providing a suspension means gripping purchase when said suspension means is cooperatively engaged with said suspension horn, a water pipe supporting portion integrally formed on said bottom end of said vertically oriented beam member for cooperatively engaging said water source pipe, an open section of said water pipe supporting portion formed through a bottom surface of said vertically oriented beam member for flexibly engaging said water source pipe, and support means engaging means integrally formed and positioned generally between said top end and said water pipe supporting portion for slidably retaining said support member.

* * * * *